(12) United States Patent
Jennings et al.

(10) Patent No.: US 6,256,445 B1
(45) Date of Patent: Jul. 3, 2001

(54) ILLUMINATED OPTICAL CONNECTION PORT FOR USE IN A FIBER DISTRIBUTION SHELF ASSEMBLY OF A FIBER ADMINISTRATION SYSTEM HAVING INTEGRAL LINE TRACING CAPABILITIES

(75) Inventors: Mark R. Jennings, Andover; Frank Salvatore Leone, Berkeley Heights; Valentine Schumakoff, Somerville; Richard Joseph Pimpinella, Hampton; Randy Alan Reagan, Morris Plains, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/209,221

(22) Filed: Dec. 11, 1998

(51) Int. Cl.[7] ...................................................... G02B 6/00
(52) U.S. Cl. ............................................................ 385/135
(58) Field of Search .................................... 385/135, 136, 385/137, 140, 139; 362/554, 555, 581, 582; 439/488, 489, 490

(56) References Cited

U.S. PATENT DOCUMENTS 5,481,440 * 1/1996 Oldham et al. ......................... 362/32
5,797,767 * 8/1998 Schell ..................................... 439/490
5,818,995 * 10/1998 Savage, Jr. .............................. 385/92
5,885,100 * 3/1999 Talend et al. ........................ 439/490
5,921,652 * 7/1999 Parker et al. ........................... 362/31

* cited by examiner

Primary Examiner—Frank G. Font
Assistant Examiner—Michael P. Stafira
(74) Attorney, Agent, or Firm—Gibbons, Del Deo, Dolan & Griffinger & Vecchione

(57) ABSTRACT

A device, system and method for locating a specific optical connection port contained within a fiber administration system having line tracing capabilities. A translucent casing is provided at each of the optical connection ports in the fiber administration system. The translucent casing can be a translucent shroud that fits over a standard optical connection port or the translucent casing can be manufactured as part of the optical connector port. Regardless of the type of translucent casing used, the translucent casing of any of the optical connection ports can be individually and selectively illuminated. According, the actual casing of an optical connection port can be illuminated within a fiber distribution shelf, thereby greatly increasing the ability of a technician to accurately locate the targeted optical connection port within the fiber administration system.

17 Claims, 3 Drawing Sheets

ILLUMINATED OPTICAL CONNECTION PORT FOR USE IN A FIBER DISTRIBUTION SHELF ASSEMBLY OF A FIBER ADMINISTRATION SYSTEM HAVING INTEGRAL LINE TRACING CAPABILITIES

BACKGROUND OF THE INVENTION

1. Field of the Invention

The present invention relates to the structure of fiber distribution shelves on which optical fibers are terminated in a fiber administration system. More particularly, the present invention relates to fiber administration systems that embody line tracing capabilities that help a technician locate a specific optical connector on the fiber distribution shelf.

2. Description of the Prior Art

There are many applications that utilize an optical fiber network to establish optical communications between a host digital terminal (HDT) at a central office and an optical network unit (ONU) at a remote location. Since a central office serves as the point of origin for the optical fibers in the optical fiber network, fiber administration systems are typically used at the central office to manage the flow of optical signals as they are directed to the various ONUs along the different optical fibers in the network.

In many fiber administration systems, as the optical fibers in a network enter the central office, they are directed into an optical distribution frame where the individual optical fibers are terminated in an organized manner. Such fiber administration systems are exemplified by the LGX® fiber administration system which is currently manufactured by Lucent Technologies of Murray Hill, New Jersey, the assignee herein. In such fiber administration systems, the optical distribution frames used at the central office are typically large structures that are arranged in parallel rows. Each optical distribution frame is commonly mounted between the floor and ceiling and only a few feet separate each row of frames.

Each optical distribution frame located at the central office typically defines a plurality of bays, wherein each bay houses several fiber distribution shelves. On each of the fiber distribution shelves are optical connection ports that receive the ends of all of the individual optical fibers that enter the central office and are contained within the optical fiber network. By terminating each optical fiber at an optical connection port on one of the different fiber distribution shelves, the location of each optical fiber becomes known within the overall assembly. Once terminated at a known address on one of the fiber distribution shelves, each optical fiber can be selectively coupled to a HDT or a variety of other optical equipment located at the central office. As a result, the optical signals sent along each optical fiber can be selectively controlled.

A fiber distribution system may contain dozens of fiber distribution shelves. Each fiber distribution system may contain hundreds or thousands of optical connection ports. In order to maintain the quality and integrity of the fiber administration system, the various optical fibers are periodically disconnected from the optical network and are connected to various types of test equipment. Additionally, as the fiber network grows, certain optical fibers get rerouted within the fiber administration system. It is often difficult for a technician to find a specific optical connection port in the hundreds of optical connection ports available in a fiber administration system. Accordingly, it is not uncommon for a technician to accidentally select the wrong optical connection port and disrupt an optical fiber pathway that should not have been disrupted.

In an attempt to assist a technician in finding a specific optical connection port, tracing systems have been developed that provide a visible indication as to the location of a targeted optical connection port. Such prior art tracing systems are exemplified by U.S. Pat. No. 5,448,675 to Leone, entitled Telecommunications Distribution Frame With Tracing. In such systems, a light is lit next to the optical connection port being targeted. A technician can see the light and is immediately led to the targeted optical connection port. The light is an LED that is positioned next to each of the optical connection ports. The LEDs are built into the connector modules that support the optical connection ports.

A problem associated with prior art systems that use LEDs is that the LEDs are small and are densely packed together on the fiber distribution shelf next to the optical connection ports. Accordingly, it is not uncommon for a technician to experience parallax and associate a particular LED or a particular signal button with the wrong optical connection port. This often results in the technician disrupting the wrong optical pathway within the fiber administration system. Similar problems exist in administration systems for hardwired connections, such as connections utilizing copper cable.

A need therefore exists for an apparatus and method that better identifies a specific optical connection port or hardwired connection port on a [fiber ]distribution shelf having line tracing capabilities.

SUMMARY OF THE INVENTION

The present invention is a device, system and method for locating a specific optical connection port contained within a fiber administration system having line tracing capabilities. A translucent casing is provided at each of the optical connection ports in the fiber administration system. The translucent casing can be a translucent shroud that fits over a standard optical connection port or the translucent casing can be manufactured as part of the optical connector port. Regardless of the type of translucent casing used, the translucent casing of any of the optical connection ports can be individually and selectively illuminated. Accordingly, the actual casing of an optical connection port can be illuminated within a fiber distribution shelf, thereby greatly increasing the ability of a technician to accurately locate the targeted optical connection port within the fiber administration system. In addition, the present invention can be utilized in conjunction with administration systems for hardwired connections, such as copper cable.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
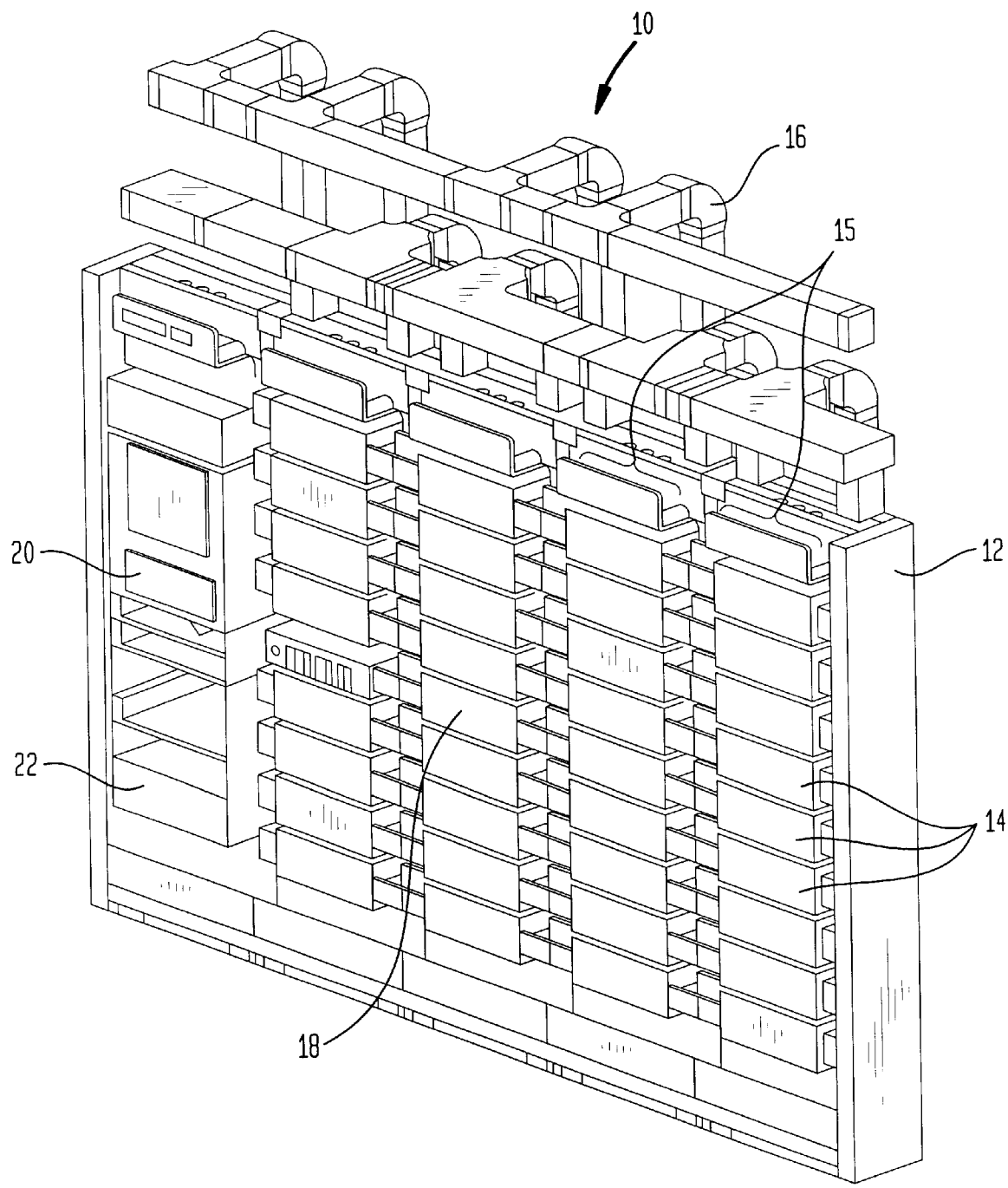
FIG. 1 is a perspective view of an optical fiber administration system containing a first plurality of bays and a second plurality of fiber distribution shelves in each bay.

In FIG. 1, a fiber administration system 10 is shown. The exemplary fiber administration system 10 includes an optical fiber distribution frame 12 that is affixed in a set position to the floor of a central office. The fiber distribution frame 12 defines a plurality of bays 15. Each bay 15 is a vertical structure that supports a plurality of fiber distribution shelves 14. The fiber distribution shelves 14 come in one of the three standard sizes, having a five inch height, a seven inch height or a nine inch height. A network of conduits 16 lead the various optical fibers from the optical fiber network to the fiber distribution shelves 14.

In addition to the fiber distribution shelves, the fiber administration system also includes a systems controller 20. The systems controller 20 runs the line tracing software used in the line tracing operations of the fiber administration system 10.

Figure 2:
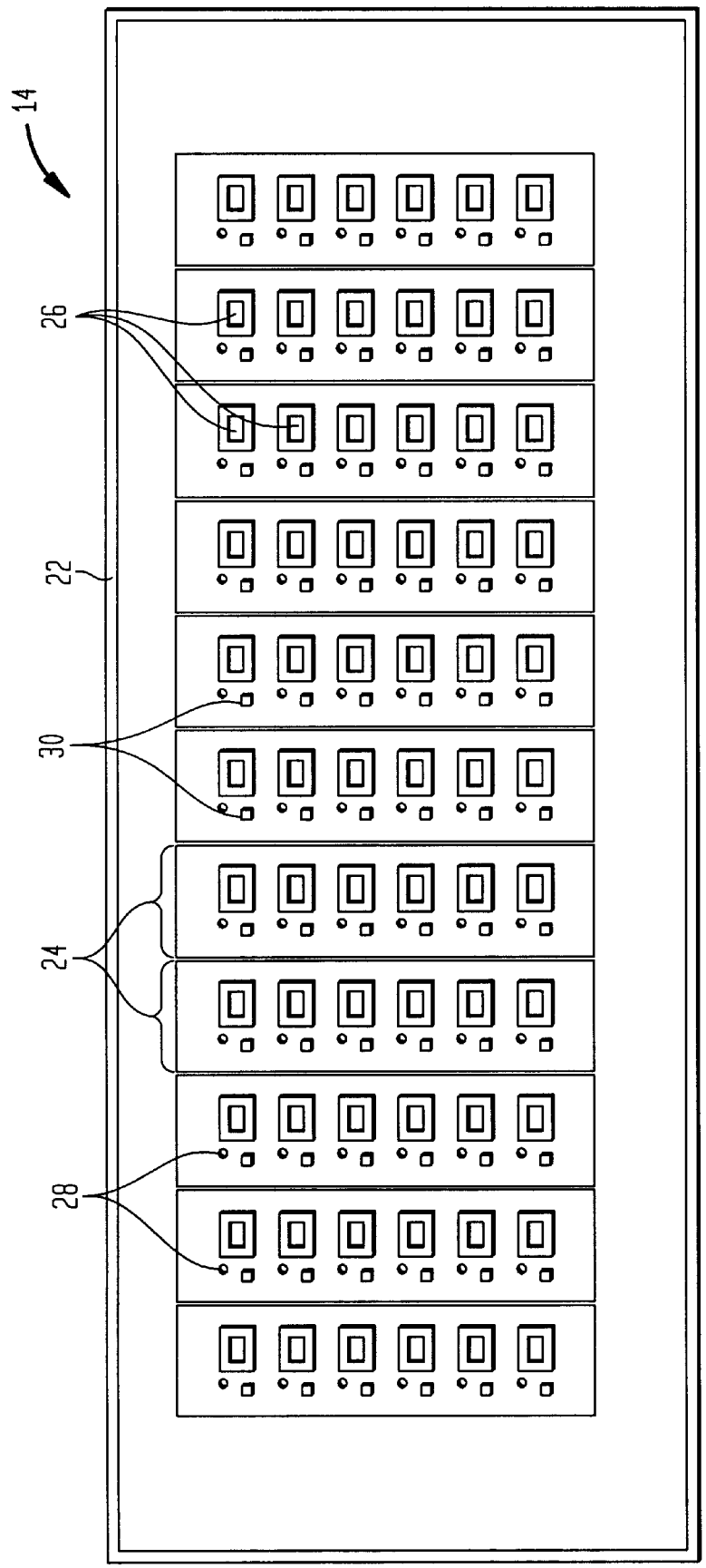
FIG. 2 is front view of a fiber distribution shelf from a fiber administration system with line tracing capabilities.

Referring to FIG. 2, a front view of a fiber distribution shelf 14 is shown. The fiber distribution shelf 14 contains a housing 22 that retains a plurality of connector modules 24. In the shown illustration there are twelve connector modules 24. Each of the connector modules 24 contains six optical connector ports 26. As such, the shown fiber distribution shelf 14 contains seventy two optical connection ports 26 dispersed across in twelve columns and six rows. The number of connection ports 26 supported by the shown fiber distribution shelf 14, however, is merely exemplary. As such, it should be understood that the number of connector modules 24 and optical connection ports 26 can be altered as desired.

Each of the optical connection ports 26 supported by fiber distribution shelf 14 is located in a unique column and row location. In addition to the optical connection port 24, at each column and row location there is also located an LED 28, and a signal button 30. The LED 28 is located immediately adjacent to the optical connection port 26 at each column and row location.

Figure 3:
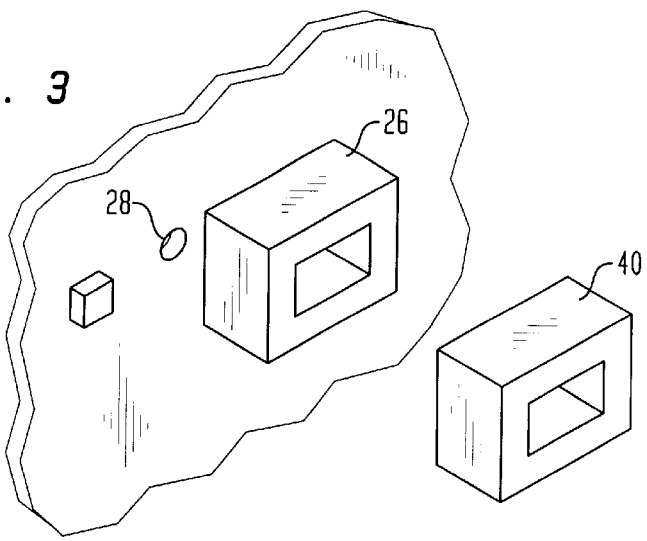
FIG. 3 is a fragmented perspective view of a single optical connector port shown in accordance with a translucent shroud.

Referring to FIG. 3, a translucent shroud 40 is shown. The shroud 40 has a tubular construction and is sized to pass over the exterior of the optical connector port 26. The shroud 40 can be retained on the exterior of the optical connector port 26 with either a friction fit of with a small amount of adhesive. As the translucent shroud 40 passes over the optical connector port 26, the shroud 40 also passes over the LED 28 positioned adjacent to the shroud 40. Accordingly, light transmitted by the LED 28 passes into the material of the translucent shroud 40. Since the shroud 40 is translucent, the light from the LED 28 enters the shroud 40 and reflects around interior surfaces of the shroud 40. Should light from the LED 28 strike an interior surface of the shroud 40 at an angle greater than the inherent angle of reflection of the shroud material, the light exits the shroud 40. The result is a shroud 40 that is internally illuminated by the LED 28 throughout its structure. Accordingly, since the shroud 40 completely surrounds the optical connection port 26, the area surrounding the optical connection port 26 is illuminated. The illuminated shroud 40 surrounding the connection port 26 provides a positive target for a technician that can not be mistaken by parallax or some other optical illusion. Consequently, the illuminated translucent shroud 40 greatly increases the likelihood that a technician will correctly service the proper optical connection port selected by the line tracing subroutines of the fiber administration system.

Figure 4:
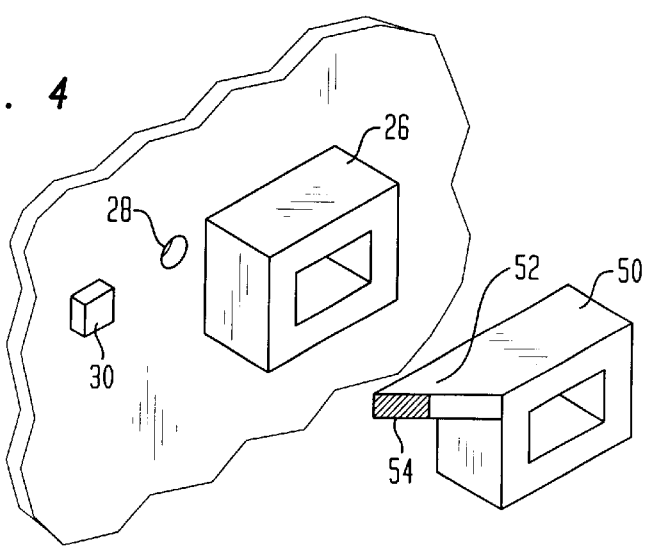
FIG. 4 is a fragmented perspective view of a single optical connector port shown in accordance with an alternate embodiment of a translucent shroud.

Referring to FIG. 4, an alternate embodiment of a shroud 50 is shown in accordance with the present invention. In the illustrated embodiment, the LED 28 is not located immediately adjacent the optical connection port 26. In such a scenario, a larger shroud could be used. However, a large shroud could obstruct access to the signal button 30 also located near each optical connection port 26. To prevent obstruction of the signal button 30, a non-symmetrical shroud 50 can be used. The non-symmetrical shroud 50 would surround the optical connection port 26 in a symmetrical pattern. However, a protrusion 52 extends from the main body of the shroud 50 that covers the LED 28. To promote the internal reflection of light from the LED 28 into the full shroud 50, reflective material 54 can be placed on the protrusion 52 of the shroud 50. The reflective material 54 would ensure that most of the light from the LED 28 would exit the material of the shroud 50 around the optical connector port 26, rather that directly through the shroud 50 in the area of the protrusion 28.

The embodiments of the shroud previously shown in FIG. 3 and FIG. 4 can be retroactively added to existing fiber administration systems that have line tracing capabilities. However, for new fiber administration systems, the technology of an illuminated shroud can be designed directly into the optical connection port itself or directly into a shroud that covers the optical connector port.

Figure 5:
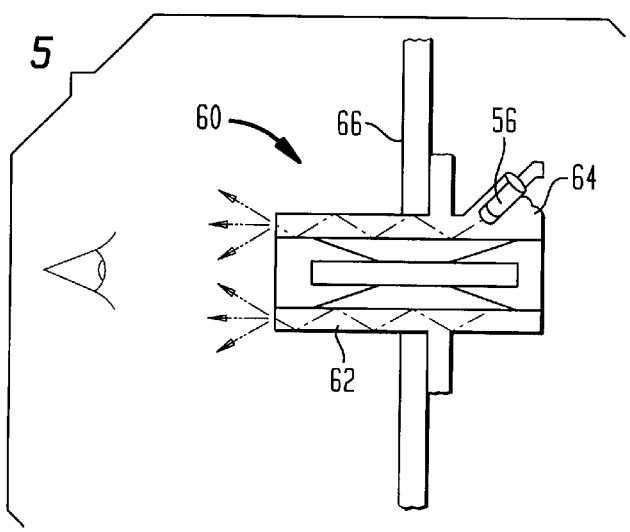
FIG. 5 is a cross-sectional view of an optical connection port having a translucent casing and an integral LED.

Referring now to FIG. 5, such an embodiment is shown, wherein an LED 56 is built into the structure of an optical connection port 60. In this embodiment, the external casing 62 of the optical connection port 60 is fabricated from a translucent material. At some point in the casing 62 of the optical connection port 60, an LED receptacle 64 is formed. The LED receptacle 64 is shaped to receive an LED 56 in an orientation so that the light emitted from the LED 56 is directed into the external casing 62 of the optical connection port 60.

Since the LED 56 is integral with the external casing 62 of the optical connection port 60, an independent LED no longer has to be present on the face surface 66 of the connector module. Accordingly, a technician can not mistake a lit LED with the wrong optical connection port.

It will be understood that the embodiment of the present invention specifically shown and described is merely exemplary and that a person skilled in the art can make alternate embodiments using different configurations and functionally equivalent components. More specifically, it should be understood that the shape of the shroud or the optical connection casing is dependent upon the location of the associated LED. Accordingly, the shapes of these components can be altered to match the position of an LED or to accommodate and LED. In addition to fiber administration systems having tracing capabilities, the present invention may also be utilized in communication administration systems for hardwired connections such as copper cable. Operations of such communications administration systems is similar to that of the fiber administration systems, where in an attempt to assist a technician in finding a specific hardwired connection port, tracing systems have been developed that provide a visible indication as to the location of a targeted connection port. In such systems, a light is lit next to the connection port being targeted. The lights in most cases are LEDs that are built into the connector modules that support the hardwired connection ports. Accordingly, the present invention is sutable for use with hardwired administration systems of the types described. All such alternate embodiments are intended to be included in the scope of this invention as set forth in the following claims.

What is claimed is:

1. In a fiber administration system containing a plurality of optical connection ports, wherein an LED is positioned adjacent each optical connection port, a translucent shroud that is positionable around an optical connection port wherein said shroud covers the LED adjacent the optical connector port and light emitted by the LED is transmitted into said translucent shroud.

2. The shroud according to claim 1, wherein said shroud is sized to engage the optical connector port with a friction fit.

3. The shroud according to claim 1, wherein said shroud is tubular in structure, having two open ends, and is symmetrically around a common center axis.

4. The shroud according to claim 1, wherein said shroud contains a symmetrical section that is sized to fit around an optical connection port and a protrusion that extends from said symmetrical section that is sized to cover the LED adjacent the optical connection port.

5. The shroud according to claim 4, wherein reflective material is disposed on said protrusion that helps direct light from within said protrusion into said symmetrical section.

6. In a hardwired communications administration system containing a plurality of connection ports, wherein an LED is positioned adjacent each connection port, a translucent shroud that is positionable around a connection port wherein said shroud covers the LED adjacent the optical connector port and light emitted by the LED is transmitted into said translucent shroud.

7. The shroud according to claim 6, wherein said shroud contains a symmetrical section that is sized to fit around a connection port and a protrusion that extends from said symmetrical section that is sized to cover the LED adjacent the connection port.

8. The shroud according to claim 7, wherein reflective material is disposed on said protrusion that helps direct light from within said protrusion into said symmetrical section.

9. In a communications administration system having line tracing capabilities, a method of locating a specific connection port in the administration system, comprising the steps of:

providing a translucent casing to each of the connection ports in the administration system; and illuminating said translucent casing of a specific connection port targeted in a line tracing procedure.

10. The method according to claim 9, wherein said step of providing a translucent casing to each of said connection ports includes placing a translucent shroud around each of said optical connection ports.

11. The method according to claim 9, wherein said step of providing a translucent casing includes fabricating each of said connection ports with a translucent casing.

12. The method according to claim 10, wherein said translucent shroud is illuminated by an LED external of said shroud.

13. The method according to claim 10, wherein an LED is disposed within said shroud and said LED illuminates said shroud internally.

14. The method according to claim 11, wherein said translucent casing is illuminated by an LED external of said translucent casing.

15. The method according to claim 11, wherein an LED is disposed within said translucent casing and said LED illuminates said translucent casing internally.

16. The method according to claim 9, wherein the step of providing a translucent casing includes forming the casing to include an LED receptacle sized to receive and retain an LED.

17. The shroud according to claim 1, wherein the shroud is removable.

* * * * *